United States Patent
Wu et al.

(10) Patent No.: US 7,774,841 B2
(45) Date of Patent: Aug. 10, 2010

(54) SYSTEM AND METHOD FOR PROTECTING NETWORK RESOURCES FROM DENIAL OF SERVICE ATTACKS

(75) Inventors: Chwan-Hwa Wu, Auburn, AL (US); J. David Irwin, Auburn, AL (US); Chien-Cheng Wang, Chiayi (TW)

(73) Assignee: Auburn University, Auburn, AL (US)

( * ) Notice: Subject to any disclaimer, the term of this patent is extended or adjusted under 35 U.S.C. 154(b) by 1084 days.

(21) Appl. No.: 10/956,568

(22) Filed: Oct. 1, 2004

(65) Prior Publication Data

US 2005/0144352 A1    Jun. 30, 2005

Related U.S. Application Data

(60) Provisional application No. 60/508,127, filed on Oct. 2, 2003, provisional application No. 60/509,650, filed on Oct. 8, 2003, provisional application No. 60/615,075, filed on Oct. 1, 2004.

(51) Int. Cl.
G06F 12/14    (2006.01)
(52) U.S. Cl. .............................. 726/22; 726/23; 726/4
(58) Field of Classification Search ............... 726/4, 726/22, 23, 11, 13, 14
See application file for complete search history.

(56) References Cited

U.S. PATENT DOCUMENTS

| | | | | |
|---|---|---|---|---|
| 5,091,942 A | 2/1992 | Dent | | 380/46 |
| 5,237,612 A | 8/1993 | Raith | | 380/247 |
| 5,841,871 A | 11/1998 | Pinkas | | 713/155 |
| 6,002,769 A | 12/1999 | McGough | | 380/28 |
| 6,058,189 A | 5/2000 | McGough | | 380/28 |
| 6,266,413 B1 | 7/2001 | Shefi | | 380/46 |
| 6,445,797 B1 | 9/2002 | McGough | | 380/285 |
| 6,487,660 B1 | 11/2002 | Vanstone et al. | | 713/168 |
| 6,891,952 B1 | 5/2005 | Puehlhoefer et al. | | 380/262 |
| 7,139,679 B1 | 11/2006 | McGrew | | 702/186 |
| 7,290,281 B1 | 10/2007 | McGrew | | 726/23 |

(Continued)

OTHER PUBLICATIONS

Dwork, et al., "Pricing via Processing or Combatting Junk Mail." In E. Brickell, editor, Proceedings of advances in Cryptology-Proc. CRYPTO '92, vol. 1323 of LNCS, pp. 139-147, Santa Barbara, CA USA, Aug. 1992.

(Continued)

Primary Examiner—Kimyen Vu
Assistant Examiner—Edward Zee
(74) Attorney, Agent, or Firm—Pillsbury Winthrop Shaw Pittman LLP

(57) ABSTRACT

The present disclosure generally pertains to systems and methods for protecting network resources from denial of service attacks. In one exemplary embodiment, a responder stores an access filter value used to determine whether an incoming message frame has been transmitted from an authorized user. In this regard, a user communication device includes logic for determining the access filter value stored at the responder and includes the access filter value in a message frame transmitted from the computer to the responder. The responder compares the received access filter value to the stored access filter value. If such values match or otherwise correspond, the responder authenticates the message frame. However, if such values do not match or otherwise correspond, the responder discards the message frame. Thus, the responder processes authenticated message frames and discards unauthenticated message frames thereby preventing denial of service attacks from malicious users.

16 Claims, 4 Drawing Sheets

U.S. PATENT DOCUMENTS

| | | | |
|---|---|---|---|
| 7,290,284 | B1 | 10/2007 | McGrew |
| 2003/0149876 | A1 | 8/2003 | McGough ............... 713/171 |
| 2003/0177391 | A1 | 9/2003 | Ofek et al. ............. 713/201 |
| 2006/0034456 | A1 | 2/2006 | McGough ................ 380/30 |
| 2007/0266241 | A1 | 11/2007 | Wu et al. ............... 713/160 |
| 2008/0184031 | A1 | 7/2008 | McGough ............... 713/171 |

OTHER PUBLICATIONS

Aura, et al., "Statelss Connections," In *Proc. Of International Conference on Information and Communications Security (ICICS '97)*, Lecture Notes in Computer Science vol. 1334, pp. 87-97. Springer, Nov. 1997.

Radia Perlman, "Understanding IKEV2: Tutorial, and rationale for decisions," draft-ietf-ipsec-ikev2-tutorial-01.txt, Feb. 2003.

Aiello, et al., "Efficient, DoS-Resistant, Secure Key Exchange for Internet Protocols," in *Proceedings of the 9$^{th}$ ACM conference on Computer and communications security*, Washington, D.C., 2002.

Juels, et al., "Client Puzzles: A Cryptographic Countermeasure Against Connection Depletion Attacks," in *Proc. of the Network and Distributed Systems Security Symposium (NDSS '99)*, pp. 151-165, Feb. 1999.

Jussipekka Leiwo, "Towards Network Denial of Service Resistant Protocols," In *Proc. of the 15$^{th}$ International Information Security Conference (IFIP?SEC)*, Aug. 2000.

Aura, et al., "DOS-resistant Authentication with Client Puzzles," In *Proc. of the 8$^{th}$ International Workshop on Security Protocols*, Apr. 2000.

| Entry 1 | User ID | Access Filter Value |
| Entry 2 | User ID | Access Filter Value |
| Entry 3 | User ID | Access Filter Value |
| | ⋮ | ⋮ |
| Entry n | User ID | Access Filter Value |

SYSTEM AND METHOD FOR PROTECTING NETWORK RESOURCES FROM DENIAL OF SERVICE ATTACKS

CROSS REFERENCE TO RELATED APPLICATIONS

This document claims priority to: U.S. Provisional Application No. 60/508,127, entitled "Multifaceted Wireless Security Protocols and Schemes," and filed on Oct. 2, 2003; and U.S. Provisional Application No. 60/509,650, entitled "Security Measures for Wireless Networks," and filed on Oct. 8, 2003; and U.S. Provisional Application No. 60/615,075, entitled "System and Method for Providing Secure Communications in Networks," and filed on Oct. 1, 2004. Each of the foregoing provisional patent applications is hereby incorporated herein by reference.

RELATED ART

A denial of service (DoS) attack is a well-known problem for networks and can significantly disrupt the operation and performance of network resources. In a denial of service attack, a malicious user of the network sends a large number of message frames to a network resource, referred to herein as a "responder," within a short period of time. Servicing the large number of message frames usurps a significant amount of the responder's processing resources and capabilities thereby preventing the responder from servicing message frames from legitimate users for at least a finite period of time. Indeed, in some circumstances, denial of service attacks have been known to cause a responder to temporarily "crash" such that it is incapable of servicing any message frames from legitimate users for a significant period of time.

Denial of service attacks can be quite costly, especially for responders that are used to sell products or otherwise generate revenue during operation. In this regard, even if a denial of service causes a responder to crash for only a small amount of time, the lost revenue resulting from the period of inoperativeness can be quite extensive. Thus, techniques have been developed for protecting against denial of service attacks. However, many of the conventional techniques used to protect against denial of service attacks have vulnerabilities that malicious users can exploit in order to successfully launch a denial of service attack.

For example, some responders maintain a list of authorized users. In such an example, a responder stores a user identifier (ID) unique to each authorized user. As an example, a user's internet protocol (IP) address or password may be stored as a user ID. Before servicing a message frame, the responder finds the user ID within the frame and compares it to the list of stored user IDs. If there is a match, the responder authenticates the message (i.e., validates the message as being from an authorized user) and processes the message frame. If there is not a match, the responder discards the message frame without processing it further. Thus, the responder does not significantly process a message frame unless it has been authenticated.

The foregoing techniques have been successful in reducing the number and frequency of successful denial of service attacks. However, it is possible for a malicious user to discover a valid user ID and to thereafter use the misappropriated user ID to successfully launch a denial of service attack against a responder. In this regard, using the misappropriated user ID, it is possible for the malicious user to spoof the responder such that it authenticates the message frames sent by the malicious user. In such a situation, the malicious user may successfully launch a denial of service attack against the responder even if the responder utilizes user ID checking to protect against denial of service attacks.

Of course, encrypting the user ID can help to prevent malicious users from discovering it. However, decryption of the user ID of a message frame would likely require the responder to save a state of the message frame and to perform various processing to recover the user ID. Thus, the responder would still be susceptible to denial of service attacks. In this regard, it would be possible for a malicious user to transmit, to the responder, a sufficient number of message frames such that the responder remains busy trying to decrypt the user IDs of the message frames regardless of whether the user IDs are valid. Thus, while the responder is decrypting the user IDs of such messages, the responder may be unable to receive and process message frames from authorized users. As a result, user IDs that are used to protect against denial of service attacks are normally unencrypted thereby making it easier for a malicious user to discover valid user IDs.

Moreover, better techniques are needed for protecting network resources against denial of service attacks.

SUMMARY OF THE DISCLOSURE

Generally, embodiments of the present disclosure provide systems and methods for protecting network resources from denial of service attacks.

A system in accordance with one embodiment of the present disclosure comprises memory for storing an access filter value. The system also comprise logic configured to receive a first message frame transmitted through a network from a remote communication device and to authenticate the message frame based on the access filter value. The logic is further configured to update the access filter value based on a dynamically generated value and to transmit the dynamically generated value to the remote communication device thereby enabling the remote communication device to determine a value corresponding to the updated access filter value. The logic is also configured to authenticate a second message frame transmitted from the remote communication device based on the updated access filter value and the value corresponding with the updated filter value.

A system in accordance with another embodiment of the present disclosure comprises a user communication device and a responder. The user communication device is configured to transmit a first message frame and to transmit a second message frame after transmitting the first message frame. The user communication device is also configured to insert a first unencrypted value in the first message frame and a second unencrypted value in the second message frame. The responder is configured to receive the first and second message frames. The responder is also configured to authenticate the first message frame by comparing the first unencrypted value to a first access filter value stored at the responder and to authenticate the second message frame by comparing the second unencrypted value to a second access filter value stored at the responder. The responder is further configured to transmit, to the user communication device, sufficient information to enable the user communication device to calculate the second unencrypted value such that the second unencrypted value corresponds with the second access filter value.

A method in accordance with one embodiment of the present disclosure comprises the steps of: storing a first access filter value; receiving a first message frame transmitted through a network from a remote communication device; authenticating the first message frame based on the first access filter value; dynamically generating a value; defining a second access filter value based on the dynamically generated value; transmitting the dynamically generated value to a remote communication device thereby enabling the remote communication device to determine a value corresponding with the second access filter value; receiving a second message frame transmitted through the network from the remote communication device; and authenticating the second message frame based the second access filter value and the value corresponding with the second access filter value.

A method in accordance with another embodiment of the present disclosure comprises the steps of: receiving a first message frame from a remote communication device, the first message frame having a first unencrypted value; receiving a second message frame from the remote communication device, the second message frame having a second unencrypted value; comparing the first unencrypted value to a first access filter value; authenticating the first message frame based on the comparing the first unencrypted value step; comparing the second unencrypted value to a second access filter value; authenticating the second message frame based on the comparing the second unencrypted value step; and transmitting to the remote communication device sufficient information to enable the remote communication device to calculate the second unencrypted value such that the second unencrypted value corresponds with the second access filter value.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for protecting network resources from denial of service attacks. In one exemplary embodiment, a responder stores a parameter, referred to herein as an "access filter value," that is used to determine whether an incoming message frame has been transmitted from an authorized user. In this regard, a user communication device includes logic for determining the access filter value stored at the responder and includes the access filter value in a message frame transmitted from the computer to the responder. The responder first compares the received access filter value to the stored access filter value. If such values match or otherwise correspond, the responder authenticates the message frame and further processes the message frame. However, if such values do not match or otherwise correspond, the responder discards the message frame. Thus, the responder processes authenticated message frames and discards unauthenticated message frames thereby preventing denial of service attacks from malicious users.

Moreover, the comparison of the access filter values can be performed in a relatively short period of time, and it is unnecessary for the responder to save a state of the message frame before deciding whether the message frame should be discarded. In this regard, it is possible for the responder to accept or reject a current message frame before the next message frame is to be evaluated by the responder. Thus, even if a malicious user transmits a large number of frame messages in a short period of time, the responder should be able to reject such message frames without preventing the responder from processing other message frames from authorized users. Accordingly, the attempted denial of service attack can be prevented.

In one embodiment, the stored access filter value is updated from time-to-time (e.g., each time the responder receives a message frame from or transmits a message frame to the authorized user), and the logic at the user communication device is provided with sufficient information for determining the updated access filter value. Thus, even if a malicious user intercepts or otherwise discovers a previously-used access filter value, the malicious user will be unable to utilize this value to spoof the responder and thereby launch a successful denial of service attack. In this regard, the responder preferably does not authenticate message frames from the malicious user since the previously-used access filter value contained in such message frames does not match or otherwise correspond to the updated access filter value stored at the responder 18.

Figure 1:
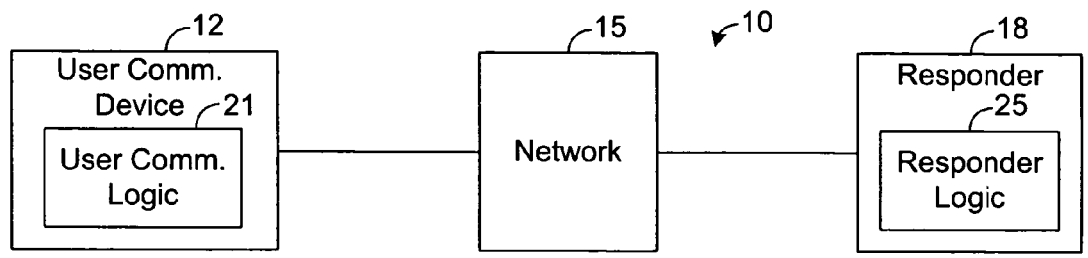
FIG. 1 is a block diagram illustrating an exemplary network communication system in accordance with one embodiment of the present disclosure.

FIG. 1 depicts a network communication system 10 in accordance with one exemplary embodiment of the present disclosure. As shown by FIG. 1, the system 10 comprises a user communication device 12, such as a computer, coupled to a network 15, such as the Internet, for example. As shown by FIG. 1, a responder 18 is remotely located from the device 12 and is also coupled to the network 15. As used herein, a "responder" refers to any network resource (e.g., a server, gateway, firewall, virtual private network (VPN), etc.) that responds to message frames. User communication logic 21 within the device 12 is configured to communicate with responder logic 25 within the responder 18.

In particular, message frames transmitted by the user communication logic 21 include a destination identifier, such as an Internet Protocol (IP) address, that identifies the responder 18. Based on this destination identifier, the network 15 routes the foregoing message frames to the responder 18, and the responder logic 25 receives and processes the message frames, as will be described in more detail hereafter. Similarly, message frames transmitted by the responder logic 25 include a destination identifier, such as an IP address, that identifies the user communication device 12. Based on this destination identifier, the network 15 routes the foregoing message frames to the user communication device 12, and the logic 21 receives and processes the message frames, as will be described in more detail hereafter.

Figure 2:
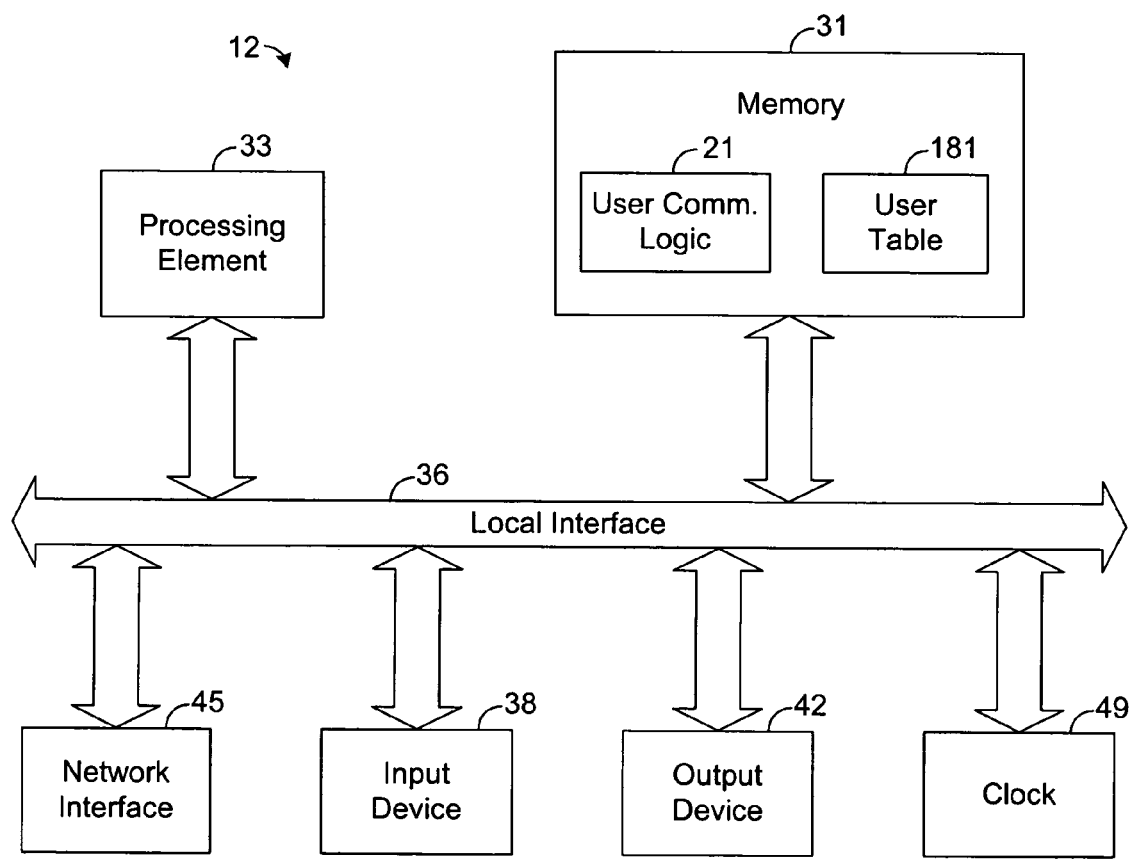
FIG. 2 is a block diagram illustrating a user communication device depicted in FIG. 1.

FIG. 2 depicts a more detailed view of the user communication device 12. In the exemplary embodiment shown by FIG. 2, the user communication logic 21 is implemented in software and stored within memory 31 of the device 12. However, in other embodiments, the user communication logic 21 may be implemented in hardware, software, or a combination thereof.

The exemplary embodiment of the user communication device 12 depicted by FIG. 2 comprises one or more conventional processing elements 33, such as a digital signal processor (DSP) or a central processing unit (CPU), that communicate to and drive the other elements within the device 12 via a local interface 36, which can include one or more buses. When the user communication logic 21 is implemented in software, as shown by FIG. 2, the processing element 33 can be configured to execute instructions of the logic 21. Furthermore, an input device 38, for example, a keyboard or a mouse, can be used to input data from a user of the device 12, and an output device 42, for example, a printer or a monitor, can be used to output data to the user.

A network interface 45, such as a modem, is coupled to the network 15 (FIG. 1) and enables the device 12 to communicate with the network 15. Note that the network interface 45 may be coupled to the network 15 via one or more wireless or non-wireless channels. Further, a clock 49 tracks time and provides time data indicative of the current time. As an example, the clock 49 may be configured to provide a set of time data, sometimes referred to as a "time stamp," that is indicative of the current time when the time stamp is generated.

Figures 3, 4:
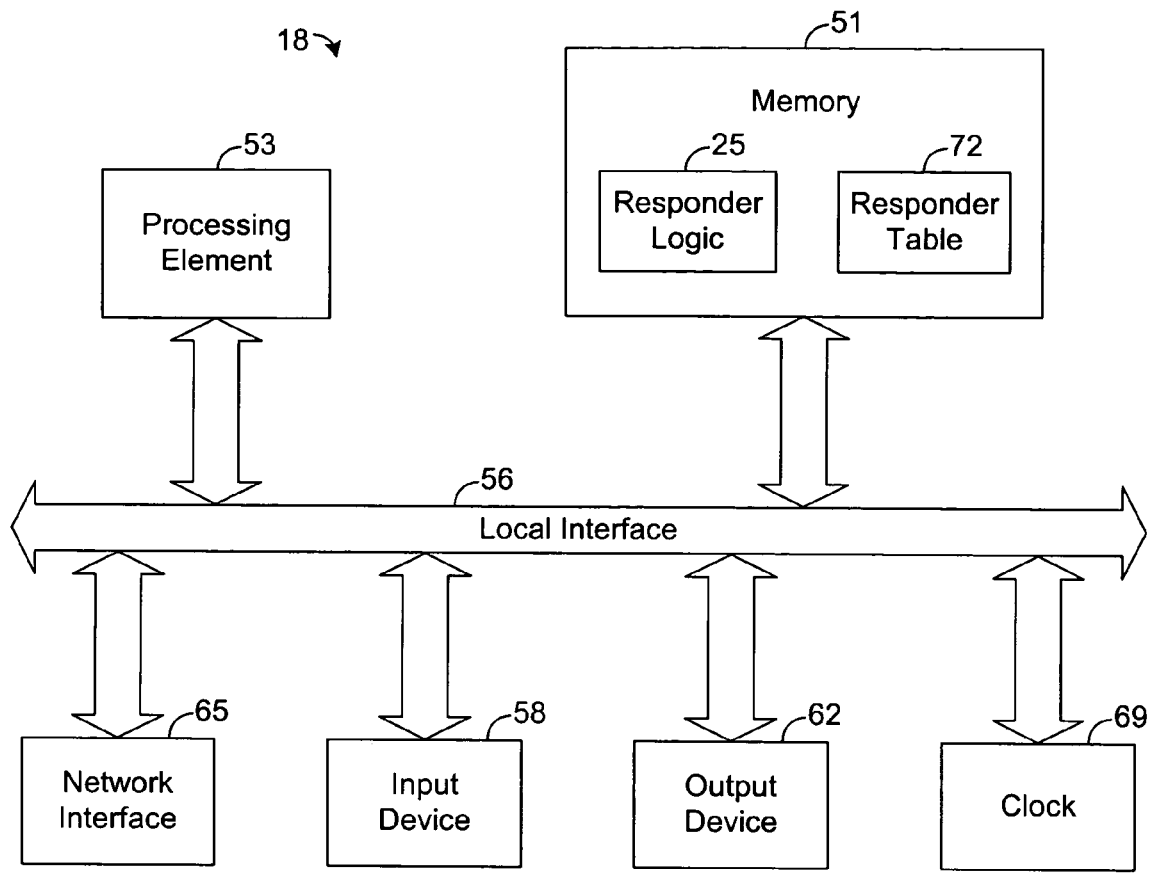
FIG. 3 is a block diagram illustrating a responder depicted in FIG. 1.
FIG. 4 is a block diagram illustrating a responder table depicted in FIG. 3.

FIG. 3 depicts a more detailed view of the responder 18. In the exemplary embodiment shown by FIG. 3, the responder logic 25 is implemented in software and stored within memory 51 of the responder 18. However, in other embodiments, the responder logic 25 may be implemented in hardware, software, or a combination thereof.

The exemplary embodiment of the responder 18 depicted by FIG. 3 comprises one or more conventional processing elements 53, such as a digital signal processor (DSP) or a central processing unit (CPU), that communicate to and drive the other elements within the responder 18 via a local interface 56, which can include one or more buses. When the responder logic 25 is implemented in software, as shown by FIG. 3, the processing element 53 can be configured to execute instructions of the responder logic 25. Furthermore, an input device 58, for example, a keyboard or a mouse, can be used to input data from a user of the responder 18, and an output device 62, for example, a printer or a monitor, can be used to output data to the user.

A network interface 65 is coupled to the network 15 (FIG. 1) and enables the responder 18 to communicate with the network 15. Note that the network interface 65 may be coupled to the network 15 via one or more wireless or non-wireless channels. Further, a clock 69 tracks time and provides time data indicative of the current time. As an example, the clock 69 may be configured to provide a set of time data, sometimes referred to as a "time stamp," that is indicative of the current time when the time stamp is generated.

Note that the user communication logic 21 and/or the responder logic 25, when implemented in software, can be stored and transported on any computer-readable medium for use by or in connection with an instruction execution system or device, such as a computer-based system, processor-containing system, or other system that can fetch and execute instructions. In the context of this document, a "computer-readable medium" can be any medium that can contain, store, communicate, propagate, or transport a program for use by or in connection with an instruction execution system or device. Note that the computer-readable medium could even be paper or another suitable medium upon which the program is printed, as the program can be electronically captured, via for instance optical scanning of the paper, then compiled, interpreted or otherwise processed in a suitable manner if necessary, and then stored in a computer memory.

The responder logic 25 is configured maintain a table 72 of access filter values. The table 72 comprises an access filter value for each user that is authorized to access the responder 18. In one embodiment, the table 72 comprises n number of entries, where n is any positive integer. As shown by FIG. 4, each entry has a user ID, such as an IP address, that identifies an authorized user, as well as the access filter value associated with such user. The entries may include other information as well.

Moreover, before a user is allowed to communicate with the responder 18, the user ID and access filter value associated with the user are defined and stored in the table 72. Further, the user is provided with sufficient information to enable the user communication logic 21 to determine the user's access filter value. Thereafter, when the user utilizes the device 12 to transmit a message frame to the responder 18, the user communication logic 21 is configured to include, in the message frame, the user ID and access filter value associated with the user. Although portions of the message frame may be encrypted, the user ID and access filter value are preferably unencrypted so that the responder 18 may quickly authenticate the message frame based on such parameters, as will be described in more detail below.

For each message frame transmitted to the responder 18, the responder logic 25 uses the user ID included in the message frame to retrieve, from the table 72, the access filter value associated with the user that transmitted the message frame. In the instant example, the responder logic 25 searches the table 72 for the entry having the user ID, and retrieves the access filter value included in this entry. The responder logic 25 then compares the retrieved access filter value with the access filter value from the message frame.

If there is a correspondence between the compared values (e.g., if the compared values match), then the responder logic 25 authenticates the message frame as coming from an authorized user. In such an example, the responder logic 25 saves a state of the message frame to memory 51 and further processes the message frame. As an example, if a portion of the message frame is encrypted, the responder logic 25 may decrypt such portion. If the message frame includes a request for data, the responder logic 25 may be configured to transmit the requested data via one or more message frames to the user communication device 12. Various other techniques for processing the authenticated message frame are possible in other examples.

However, if there is no correspondence between the compared access filter values (e.g., if the access filter value received from the user communication device 12 does not match the access filter value retrieved from the table 72), then the responder logic 25 discards the message frame. In this regard, the message frame is preferably discarded before the responder logic 25 stores any state of the message frame to memory 51 or performs any significant processing of the message frame. Thus, if a malicious user transmits a message frame that does not include an access filter value associated with an authorized user, the responder logic 25 quickly discards the message frame once it arrives at the responder 18. Moreover, even if a malicious user launches a denial of service attack by transmitting, to the responder 18, a large number of message frames in a short amount of time, the responder 18 should be able to quickly discard such message frames without disrupting its operation in servicing other message frames from authorized users. In other words, the responder 18 should be able to successfully defend against the denial of service attack.

In one embodiment, the responder logic 25 updates an access filter value stored in the table 72 after using such value to authenticate an incoming message. In this regard, once a message frame from a user is authenticated, the responder logic 25 calculates a new access filter value for the user based on a predetermined algorithm that utilizes a dynamically generated value, such as a randomly generated number or a time stamp value from the clock 69. The responder logic 25 then replaces the user's access filter value currently stored in the table 72 with the new access filter value. Thus, for the next message frame transmitted by the user, the responder logic 25 preferably uses the new access filter value to authenticate the message frame. Therefore, even if a malicious user discovers the previously-used access filter value, the malicious user should be prevented from using such value to launch a successful denial of service attack against the responder 18.

However, for the user's next message frame to be authenticated by the responder 18, the message frame should include the new access filter value that is used to replace the previously-used access filter value. Thus, once the responder logic 25 calculates the new access filter value, the logic 25 transmits, to the device 12, sufficient information for enabling the user communication logic 21 to also calculate the new access filter value. For example, if a dynamically generated value is used by the responder logic 25 to calculate the new access filter value, as described above, the responder logic 25 may transmit the dynamically generated value to the user communication logic 21. Note that the dynamically generated value may be encrypted according to any known or future-developed encryption scheme.

After receiving the dynamically generated value, the user communication logic 21 is configured to use this value to calculate the new access filter value. In this regard, the user communication logic 21 may be aware of the same algorithm used by the responder logic 25 to calculate the new access filter value and utilize this algorithm, in conjunction with the dynamically generated value, to also calculate the new access filter value. The user communication logic 21 then stores the new access filter value so that it is available for the next message frame to be transmitted to the responder 18.

In this regard, when a new message frame is to be transmitted to the responder 18, the user communication logic 21 retrieves the new access filter value and includes this value in the new message frame. Thus, when the responder 18 receives the new message frame, the responder logic 25 authenticates the new message frame based on the new access filter value. Accordingly, the aforedescribed update to the access filter value stored in table 72 may prevent an unauthorized user who discovers the previously-used access filter value from successfully launching a denial of service attack without preventing the authorized user from accessing the responder 18.

Figure 5:
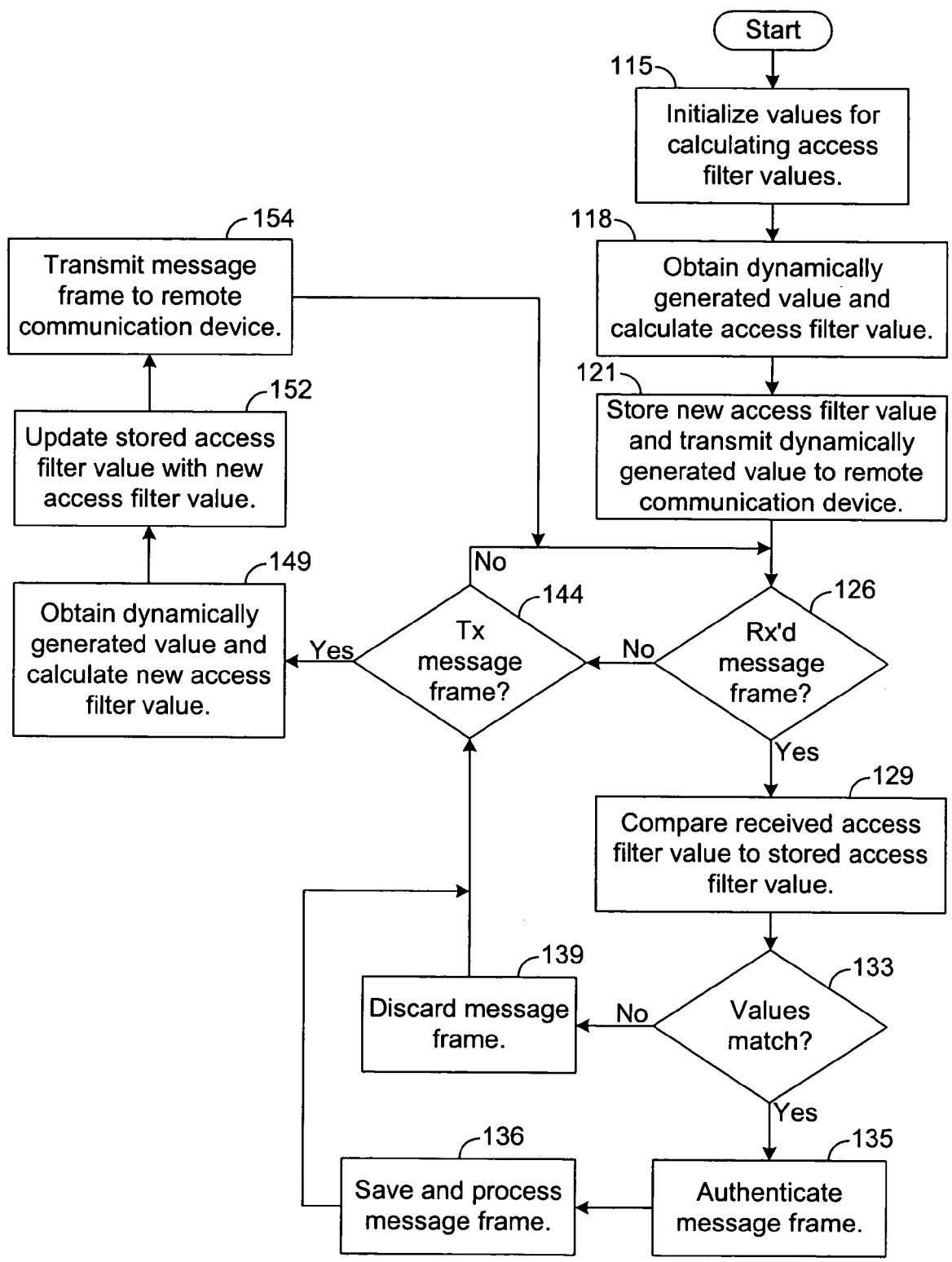
FIG. 5 is a flow chart illustrating an exemplary architecture and functionality of the responder depicted in FIG. 3.

An exemplary operation of the responder logic 25 will now be described with particular reference to FIG. 5. In block 115, the responder logic 25 initializes values that may be used to calculate the first instance, referred to hereafter as $F_0$, of the access filter value associated with the user of device 12. In this regard, $F_0$ may be based on information received from the user communication device 12 or otherwise provided by the user of the device 12. In block 118, the responder logic 25 dynamically generates a value and calculates $F_0$ based on this dynamically generated value and possibly information initialized in block 115. The dynamically generated value may comprise a time stamp value from clock 69 and/or other types of values, such as a random number generated by a known or future-developed random number generation algorithm. In block 121, the responder logic 25 stores $F_0$ in the responder table 72 and transmits the value dynamically generated in block 118 to the user communication device 12. In storing $F_0$, the responder logic 25 correlates $F_0$ with the user ID identifying the user of the device 12. As an example, the responder logic 25 may store $F_0$ and the user ID in the same entry of the table 72.

After receiving the dynamically generated value, the user communication logic 21 uses such value to calculate $F_0$. When the user communication logic 21 transmits a message frame to the responder 18, the user communication logic 21 inserts, in the message frame, the access filter value, $F_0$, as well as the user ID associated with the user of the device 12.

When the message frame is received at the responder 18, the responder logic 25 makes a "yes" determination in block 126 and proceeds to block 129. In particular, the responder logic 25 retrieves, from the responder table 72, the access filter value (i.e., $F_0$) that is correlated with the user ID of the message frame. The responder logic 25 then compares the retrieved value to the access filter value included in the received message frame. In the instant example, the compared values match since the message frame has been transmitted from an authorized user, and the responder logic 25 makes a "yes" determination in block 133. Thus, the responder logic 25 authenticates the message frame in block 135. After authenticating the message frame, the responder logic 25 saves the message frame to memory 51 and processes the message frame in block 136. For example, if a portion of the message frame is encrypted, the responder logic 25 may decrypt the encrypted portion or instruct another component (not specifically shown) of the responder 18 to decrypt the encrypted portion or otherwise process the message frame.

Note that, if the received message frame was transmitted by an unauthorized user instead of the authorized user of the device 12, then such unauthorized user would be unable to include $F_0$ in the message. Thus, in such an example, the responder logic 25 would discard the message frame in block 139 without saving and processing the message frame in block 136.

In block 144, the responder logic 25 determines whether to transmit a message frame to the user communication device 12. In the instant example, the responder logic 25 is preferably configured to transmit a message frame to the user communication device 12 after each message frame received from the device 12. Note that the responder logic 25 may transmit to the user communication device 12 other times as well.

Moreover, in the instant example, the responder logic 25 makes a "yes" determination in block 144 after performing block 136. Thus, the responder logic 25 obtains a dynamically generated value in block 149 and calculates a new access filter value, $F_1$. The responder logic 25, in block 152, then replaces the access filter value, $F_0$, stored in the table 72 with the new access filter value, $F_1$. In block 154, the responder logic 25 transmits a message frame that includes the dynamically generated value used in block 149 to calculate $F_1$. Based on this dynamically generated value, the user communication logic 21 is able to calculate the new access filter value, $F_1$, and to include $F_1$ in the next message frame transmitted from the user communication device 12 to the responder 18. Therefore, when the responder 18 receives such a message frame, the responder logic 25 will make a "yes" determination in block 133 and authenticate the message frame in block 135.

However, if the responder 18 receives a message frame from an unauthorized user who has discovered $F_0$ and inserted $F_0$ in the message frame, the responder logic 25 will make a "no" determination in block 133 upon receipt of such a message frame and discard the message frame in block 139 without authenticating it. Thus, even if an unauthorized user discovers $F_0$ by, for example, analyzing one of the message frames communicated between the responder 18 and user communication device 12, the unauthorized user will be prevented from using $F_0$ to launch a successful denial of service attack.

It should be noted that the use of a user ID, as described above, is unnecessary. For example, the responder logic 25 can be configured to store different access filter values for different users without correlating such access filter values with user IDs. In such an example, the responder logic 25 may be configured to search the stored access filter values for a value that matches an access filter value from a received message frame. If such a stored access filter value is found, the responder logic 25 may be configured to authenticate the message frame. However, if no such stored access filter value is found, the responder logic 25 may be configured to discard the message frame without authenticating it.

It should also be noted that various network resources may be configured to defend against denial of service attacks. For example, the user communication device 12 may be configured to store access filter values and to authenticate only received message frames that have an access filter value corresponding to one of the access filter values stored at the user communication device 12. Indeed, the user communication device 12 may employ techniques similar to those described above for the responder 18 in order to protect against denial of service attacks. An exemplary embodiment will be described hereafter in which both the user communication device 12 and the responder 18 protect against denial of service attacks.

In this regard, a private key, $K_U$, associated with the user of the device 12, a private key, $K_R$, associated with the responder 18, and a random number, $N_i$, are exchanged between the user communication device 12 and responder 18. A secure connection may be used to exchange such information, or other techniques for securely delivering the information to the user communication device 12 and responder 18 may be employed. Although other values of the private keys are possible in other embodiments, $K_U$ and $K_R$ are defined by the following equations in the instant example:

$$K_U = h_{(N_{ui})}[U_{id}\|P_u\|T_u\|N_{ui}] \quad (1)$$

$$K_R = h_{(N_{Ri})}[R_{id}\|P_R\|T_R\|N_{Ri}] \quad (2)$$

where $U_{id}$ is a user identifier (i.e., a value that uniquely identifies the user communication device 12 or a user of the user communication device 12), $P_u$ is a password provided by the user of the user communication device 12, $T_u$ is a time stamp from clock 49, $N_{ui}$ is a nonce value known only by the user communication device 12, $R_{id}$ is a responder identifier (i.e., a value that uniquely identifies the responder 18 or a user of the responder 18), $P_R$ is a password of the responder 18, $T_R$ is a time stamp from clock 69, $N_{Ri}$ is a nonce value known only by the responder 18, $h(_{Nui})$ and $h(_{NRi})$ are both HMAC functions using key $N_{ui}$ and $N_{Ri}$, respectively.

After $K_U$, $K_R$, and $N_i$ are defined, the responder logic 25 calculates an access filter value correlated with the user of the device 12 and stores this value in the responder table 72. To calculate the access filter value, the responder logic 25 obtains a time stamp value, $T_{NR}$, from the clock 69 and calculates a value, referred to hereafter as seed value, $S_{Ri}$, using the following equation:

$$h_{(N_i \oplus K_R)}[N_i\|N_R\|T_{NR}] = S_{Ri} \quad (3)$$

In one exemplary embodiment, $S_{Ri}$ is a 512-bit value, although such a value may comprise other numbers of bits in other embodiments.

After determining $S_{Ri}$, the responder logic 25 calculates a keyed hash value, $MAC_{R(0)}$, which in the instant example is a 512-bit value, although such value may comprise other numbers of bits in other embodiments. In this regard, the responder logic 25 calculates $MAC_{R(0)}$ using the following equation:

$$h_{(S_{Ri})}^{N_i \oplus N_R}[U_{id}\|K_U\|N_i\|N_R\|T_{NR}] \equiv MAC_{R(0)} \quad (4)$$

Figure 6:
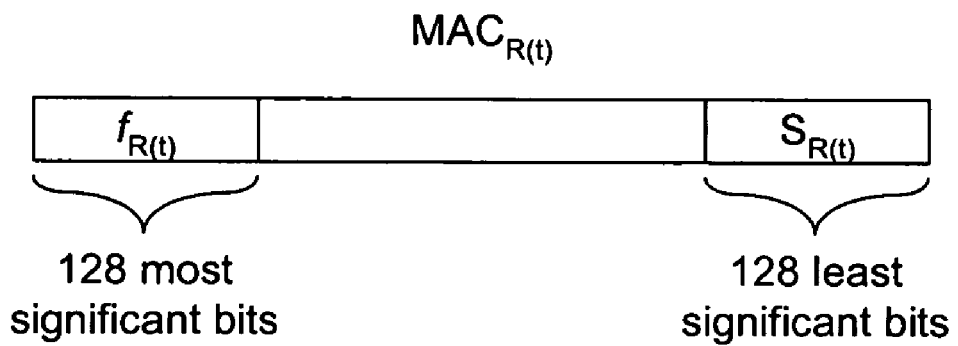
FIG. 6 is a block diagram illustrating an exemplary keyed hash value for calculating an access filter value that is used by the responder depicted in FIG. 3 to authenticate a message frame received from the user communication device depicted in FIG. 2.

Note that $N_i \oplus N_R$ is the number of rounds used to conduct the hash function. From a performance standpoint, it may be desirable that the number be truncated to a certain number of bits, such as 10 (i.e., 0 to 1023 rounds). In the instant embodiment, $MAC_{R(0)}$ is truncated in three parts, which include the 128 most significant bits, $f_{R(t)}$, and the 128 least significant bits, $S_{R(t)}$, as shown in FIG. 6. The parameter, t, is the index of a time-dependent function, and t=0 is the first seed used to generate the initial access filter value.

$f_{R(0)}$ is the seed used to generate the initial access filter value, $F_{R(0)}$, according to the following equation:

$$h_{(S_{Ri})}[K_U\|N_i\|MAC_{R(0)}\|T_{NR}\|f_{R(0)}] = F_{R(0)} \quad (5)$$

In one exemplary embodiment, $F_{R(0)}$ is a 160-bit value, although such a value may comprise a different number of bits in other embodiments. After calculating the initial access filter value, $F_{R(0)}$, the responder logic 25 stores $F_{R(0)}$ in the responder table 72. As described herein, the next message frame received from the user communication device 12 should include $F_{R(0)}$ in order for the responder logic 25 to authenticate the message frame.

After storing $F_{R(0)}$, the responder logic 25 preferably transmits, to the user communication device 12, the values of $N_R$ and $T_{NR}$ that were used to calculate $F_{R(0)}$. To provide a more secure environment, the responder logic 25 preferably encrypts the transmitted values using any known of future-developed encryption technique. As an example, the responder logic 25 may encrypt $N_R$ and $T_{NR}$ via AES encryption using $K_R$ as an encryption key.

Upon receiving $N_R$ and $T_{NR}$, the user communication logic 21, if necessary, decrypts these values and then uses these values to calculate $F_{R(0)}$ according to the same algorithm used by the responder logic 25 to calculate $F_{R(0)}$ at the responder 18. The user communication logic 21 then stores $F_{R(0)}$ in memory 31 so that this value may later be used to transmit a message frame to the responder 18, as will be described in more detail hereafter.

The user communication logic 21 also calculates an access filter value, $F_{U(0)}$, to be used for authenticating the responder 18, as will be described in more detail hereafter. In this regard, the user communication logic 21 calculates $F_{U(0)}$ according the same algorithm used to calculate $F_{R(0)}$ except that the user communication logic 21 uses different values. In particular, the user communication logic 21 obtains a time stamp, $T_{NU}$, from clock 49 and generates a random number, $N_U$, using any known or future-developed random number generation algorithm. Then, the user communication logic 21 calculates a value, referred to hereafter as seed value, $S_{Ui}$, using the following equation:

$$h_{(K_U \oplus N_i)}[N_i\|N_R\|N_U\|T_{NU}] = S_{Ui} \quad (6)$$

In one exemplary embodiment, $S_{Ui}$ is a 512-bit value, although such a value may comprise other numbers of bits in other embodiments.

After determining $S_{Ui}$, the user communication logic 21 calculates a keyed hash value, $MAC_{U(0)}$, which in the instant example is a 512-bit value, although such value may comprise other numbers of bits in other embodiments. In this regard, the user communication logic 21 calculates $MAC_{U(0)}$ using the following equation:

$$h_{(S_{Ui})}^{N_i \oplus N_U} [U_{id}\|K_U\|N_i\|N_R\|N_U\|T_{NU}] \equiv MAC_{U(0)} \qquad (7)$$

Figure 7:
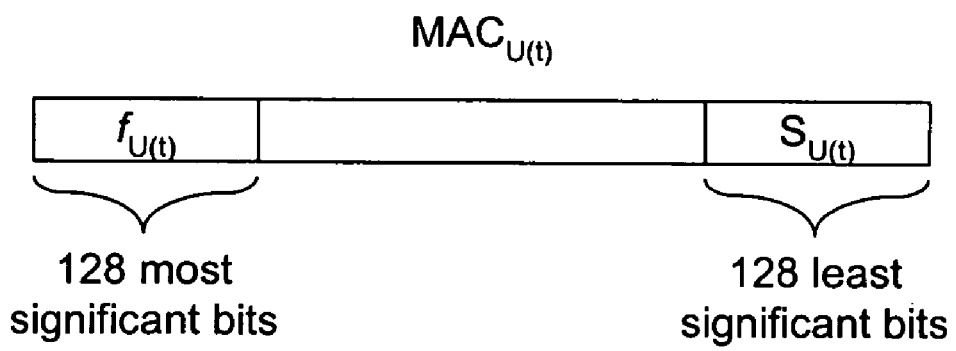
FIG. 7 is a block diagram illustrating an exemplary keyed hash value for calculating an access filter value that is used by the user communication device depicted in FIG. 2 to authenticate a message frame received from the responder depicted in FIG. 3.

Note that $N_i \oplus N_U$ is the number of rounds used to conduct the hash function. From a performance standpoint, it may be desirable that the number be truncated to a certain number of bits, such as 10 (i.e., 0 to 1023 rounds). In the instant embodiment, $MAC_{U(0)}$ is truncated in three parts, which include the 128 most significant bits, $f_{U(t)}$, and the 128 least significant bits $S_{U(t)}$, as shown in FIG. 7. The parameter, t, is the index of a time-dependent function, and t=0 is the first seed used to generate the initial user access filter value, $F_{U(0)}$.

$F_{U(0)}$ is the seed used to generate the initial access filter value, $F_{U(0)}$, according to the following equation:

$$h_{(S_{Ui})}[K_U\|N_U\|MAC_{U(0)}\|T_{NU}\|f_{U(0)}]=F_{U(0)} \qquad (8)$$

In one exemplary embodiment, $F_{U(0)}$ is a 160-bit value, although such a value may comprise a different number of bits in other embodiments. After calculating the initial access filter value, $F_{U(0)}$, the responder logic 25 stores $F_{U(0)}$ in a user table 181 (FIG. 2). As described herein, the next message frame received from the responder 18 should include $F_{U(0)}$ in order for the user communication logic 21 to authenticate the message frame.

At some point, the user of the device 12 initiates a transmission from the user communication device 12 to the responder 18. As an example, assume that the user of user communication device 12 submits a request to retrieve data stored at the responder 18. Thus, the user communication logic 21 transmits to the responder 18 a message frame including data that defines the user's request. To enable the responder 18 to authenticate the message frame, the user communication logic 21 retrieves $F_{R(0)}$, and inserts this value into the message frame. To enable the responder 18 to calculate $F_{U(0)}$, the user communication logic 21 also inserts $T_{NU}$ and $N_U$ into the message frame. If the responder logic 25 is configured to access the responder table 72 based on $U_{id}$, the user communication logic 21 also inserts $U_{id}$ into the message frame.

To provide a more secure environment, the user communication logic 21 may encrypt the data defining the request, as well as $N_U$ and $T_{NU}$ using any known or future-developed encryption technique. As an example, the user communication logic 21 may encrypt $N_U$ and $T_{NU}$ via AES encryption using $K_U$ as an encryption key.

Upon receiving the message frame, the responder logic 25 compares the access filter value (i.e., $F_{R(0)}$) within the message frame to the access filter value (i.e., $F_{R(0)}$) correlated with the user by the responder table 72. In the instant example, the compared values match, and the responder logic 25 therefore authenticates the message frame. Thus, the responder logic 25 stores a state of the message frame and further processes the message frame.

As an example, the responder logic 25 may decrypt the request for data, as well as $N_U$ and $T_{NU}$, included in the message frame. Based on $N_U$ and $T_{NU}$, the responder logic 25 calculates $F_{U(0)}$ according to the same algorithm used by the user communication logic 21 to calculate $F_{U(0)}$ at the user communication device 12. The responder logic 25 then stores $F_{U(0)}$ in memory 51 so that this value may later be used to transmit a message frame to the user communication device 12, as will be described in more detail hereafter.

The responder logic 21 is also configured to obtain a new time stamp, $T_{RF(1)}$, and to calculate a new access filter value, $F_{R(1)}$, based on $T_{RF(1)}$. In particular, to calculate $F_{R(1)}$, the responder logic 21 uses equations 1 and 3-5 described above except that the responder logic 25 uses $T_{RF(1)}$ in place of $T_{NR}$. In the responder table 72, the responder logic 25 then overwrites $F_{R(0)}$ with $F_{R(1)}$. Thus, for the next message frame received from user communication device 12, $F_{R(1)}$ instead of $F_{R(0)}$ will be used to authenticate the message frame.

In processing the message frame received from user communication device 12, the responder logic 25 retrieves the data requested by the user. The responder logic 25 then transmits a message frame including this data to the user communication device 12. To enable the user communication logic 21 to authenticate the message frame according to techniques described herein, the responder logic 25 includes $F_{U(0)}$ in the message frame. Further, to enable the user communication logic 21 to calculate the new access filter value, $F_{R(1)}$, to be used in the next message frame transmitted from the user communication device 12 to the responder 18, the responder logic 25 also inserts $T_{RF(1)}$ in the message frame being transmitted from the responder 18 to the user communication device 12. Thus, upon receiving the message frame from the responder 18, the user communication logic 21 is able to validate the message frame based on $F_{U(0)}$ and to calculate $F_{R(1)}$. Moreover, the access filter values may continually be updated and used, as described above, to authenticate the message frames being communicated between the responder 18 and user communication device 12.

Note that, to provide a more secure environment, the key $K_U$, as well as $N_{ui}$ and $T_U$, may be updated each time a user initiates a new session. In this regard, a session refers to the time period between the times that the user of the device 12 logs-in and logs-off the device 12. When the user logs in, the user communication logic 21 may be configured to generate a new $K_U$, $N_{ui}$, and $T_U$. During the session, such values may be communicated to the responder 18 via one or more message frames. Thus, for the next session initiated by the user, the new values of $K_U$, $N_{ui}$, and $T_U$ may be used in lieu of the previous values of $K_U$, $N_{ui}$, and $T_U$ to calculate the access filter values as described herein.

Now, therefore, the following is claimed:

1. A system for protecting a network resource from a denial of service attack, comprising:

a memory configured to store a first access filter value uniquely calculated for one remote communication device, wherein the first access filter value includes a hash value calculated from one or more randomly generated dynamic values using one or more predetermined hash functions; and responder logic configured to execute on a computer device, wherein executing the responder logic on the computer device causes the computer device to:

transmit the one or more randomly generated dynamic values to the remote communication device, wherein the remote communication device calculates a first hash value from the one or more randomly generated dynamic values using the one or more predetermined hash functions;

receive a first message frame from the remote communication device through a network interface coupled to a network, wherein the first message frame includes the first hash value calculated by the remote communication device;

authenticate the first message frame received from the remote communication device in response to the first hash value included in the first message frame matching the first access filter value;

update the one or more randomly generated dynamic values in response to authenticating the first message frame;

calculate a second access filter value from the updated one or more randomly generated dynamic values using the one or more predetermined hash functions;

transmit the updated one or more randomly generated dynamic values to the remote communication device, wherein the remote communication device calculates a second hash value from the updated one or more randomly generated dynamic values using the one or more predetermined hash functions;

receive a second message frame from the remote communication device through the network interface, wherein the second message frame includes the second hash value calculated by the remote communication device; and authenticate the second message frame received from the remote communication device in response to the second hash value included in the second message frame matching the second access filter value;

wherein the one or more randomly generated dynamic values and the updated one or more randomly generated dynamic values each include at least one of a nonce value or a time stamp value.

2. The system of claim 1, wherein executing the responder logic on the computer device further causes the computer device to:

discard the first message frame without saving a state of the first message frame in response to the first hash value included in the first message frame not matching the first access filter value; and discard the second message frame without saving a state of the second message frame in response to the second hash value included in the second message frame not matching the second access filter value.

3. The system of claim 1, wherein one or more of the first hash value included in the first message frame or the second hash value included in the second message frame is unencrypted.

4. The system of claim 1, wherein executing the responder logic on the computer device further causes the computer device to:

calculate a private key from the one or more randomly generated dynamic values using the one or more predetermined hash functions;

encrypt the one or more randomly generated dynamic values using the private key; and transmit the private key to the remote communication device, wherein the remote communication device uses the private key to decrypt the encrypted randomly generated dynamic values.

5. A method for protecting a network resource from a denial of service attack, comprising:

storing a first access filter value uniquely calculated for one remote communication device in a memory, wherein the first access filter value includes a hash value calculated from one or more randomly generated dynamic values using one or more predetermined hash functions;

transmitting the one or more randomly generated dynamic values from a computer device to the remote communication device, wherein the remote communication device calculates a first hash value from the one or more randomly generated dynamic values using the one or more predetermined hash functions;

receiving a first message frame from the remote communication device at the computer device through a network interface coupled to a network, wherein the first message frame includes the first hash value calculated by the remote communication device;

authenticating the first message frame received from the remote communication device in response to the first hash value included in the first message frame matching the first access filter value;

updating the one or more randomly generated dynamic values in response to the computer device authenticating the first message frame;

calculating a second access filter value from the updated one or more randomly generated dynamic values using the one or more predetermined hash functions;

transmitting the updated one or more randomly generated dynamic values from the computer device to the remote communication device, wherein the remote communication device calculates a second hash value from the updated one or more randomly generated dynamic values using the one or more predetermined hash functions;

receiving a second message frame from the remote communication device at the computer device through the network interface, wherein the second message frame includes the second hash value calculated by the remote communication device; and authenticating the second message frame received from the communication device in response to the second hash value included in the second message frame matching the second access filter value;

wherein the one or more randomly generated dynamic values and the updated one or more randomly generated dynamic values each include at least one of a nonce value or a time stamp value.

6. The method of claim 5, wherein one or more of the first hash value included in the first message frame or the second hash value included in the second message frame is unencrypted.

7. The method of claim 5, further comprising:

calculating a private key from the one or more randomly generated dynamic values using the one or more predetermined hash functions;

encrypting the one or more randomly generated dynamic values using the private key; and transmitting the private key from the computer device to the remote communication device, wherein the remote communication device uses the private key transmitted from the computer device to decrypt the encrypted randomly generated dynamic values.

8. The method of claim 5, further comprising:

discarding the first message frame without saving a state of the first message frame in response to the first hash value included in the first message frame not matching the first access filter value; and discarding the second message frame without saving a state of the second message frame in response to the second hash value included in the second message frame not matching the second access filter value.

9. A system for protecting a network resource from a denial of service attack, comprising:
  a memory configured to store a first access filter value uniquely calculated for a user communication device, wherein the first access filter value includes a hash value calculated from one or more randomly generated dynamic values using one or more predetermined hash functions; and
  the user communication device configured to:
  receive the one or more randomly generated dynamic values from a responder device, and upon receiving, calculate a first hash value from the one or more randomly generated dynamic values using the one or more predetermined hash functions; and
  transmit a first message frame through a network interface coupled to a network, wherein the first message frame includes the first hash value calculated by the user communication device; and
  the responder device that communicates with the user communication device through the network interface coupled to the network, wherein the responder device is configured to:
  transmit the one or more randomly generated dynamic values to the user communication device;
  calculate the first access filter value from the one or more randomly generated dynamic values using the one or more predetermined hash functions;
  receive the first message frame from the user communication device through the network interface coupled to the network; and
  authenticate the first message frame received from the user communication device in response to the first hash value included in the first message frame matching the first access filter value;
  wherein the one or more randomly generated dynamic values include at least one of a nonce value or a time stamp value.

10. The system of claim 9, wherein the responder device is further configured to discard the first message frame without saving a state of the first message frame in response to the first hash value included in the first message frame not matching the access filter value.

11. The system of claim 9, wherein the user communication device is further configured to:
  calculate a second hash value from one or more updated randomly generated dynamic values received from the responder device using the one or more predetermined hash functions; and
  transmit a second message frame that includes the second hash value calculated by the user communication device to the responder device through the network interface coupled to the network, wherein the user communication device transmits the first message frame and the second message frame to the responder device during one data session.

12. The system of claim 11, wherein the responder device is further configured to:
  calculate a second access filter value from the one or more updated randomly generated dynamic values using the one or more predetermined hash functions;
  replace the first access filter value with the second access filter value in response to authenticating the first message frame received from the user communication device;
  receive the second message frame from the user communication device through the network interface coupled to the network; and
  authenticate the second message frame received from the user communication device in response to the second hash value included in the second message frame matching the second access filter value.

13. The system of claim 11, wherein the responder device is further configured to:
  calculate a private key from the one or more updated randomly generated dynamic values using the one or more predetermined hash functions;
  encrypt the one or more updated randomly generated dynamic values using the private key; and
  transmit the private key to the user communication device, wherein the user communication device is further configured to use the private key to decrypt the encrypted randomly generated dynamic values.

14. A method for protecting a network resource from a denial of service attack, comprising:
  storing an access filter value uniquely calculated, by a responder device, for one user communication device in a memory, wherein the access filter value includes a hash value calculated from one or more randomly generated dynamic values using one or more predetermined hash functions;
  transmitting the one or more randomly generated dynamic values from the responder device to the user communication device, wherein upon receiving, the user communication device calculates a hash value from the one or more randomly generated dynamic values using the one or more predetermined hash functions;
  receiving a message frame from the user communication device at the responder device through a network interface coupled to a network, wherein the message frame includes the hash value calculated by the user communication device; and
  authenticating the message frame received from the user communication device in response to the hash value included in the message frame matching the access filter value;
  wherein the one or more randomly generated dynamic values include at least one of a nonce value or a time stamp value.

15. The method of claim 14, further comprising discarding the message frame without saving a state of the message frame in response to the hash value included in the message frame not matching the access filter value.

16. The method of claim 14, further comprising:
  calculating a private key from the one or more randomly generated dynamic values using the one or more predetermined hash functions;
  encrypting the randomly generated dynamic values using the private key; and
  transmitting the private key from the responder device to the user communication device, wherein the user communication device uses the private key to decrypt the encrypted randomly generated dynamic values.

* * * * *

UNITED STATES PATENT AND TRADEMARK OFFICE
CERTIFICATE OF CORRECTION

PATENT NO. : 7,774,841 B2
APPLICATION NO. : 10/956568
DATED : August 10, 2010
INVENTOR(S) : Chwan-Hwa Wu It is certified that error appears in the above-identified patent and that said Letters Patent is hereby corrected as shown below:

In item (73) change Assignee to:

Auburn University        Auburn, Alabama

Signed and Sealed this

Twenty-eighth Day of September, 2010

David J. Kappos
*Director of the United States Patent and Trademark Office*